H. T. EVANS.
FILTER.
APPLICATION FILED NOV. 6, 1913.
1,182,465. Patented May 9, 1916.
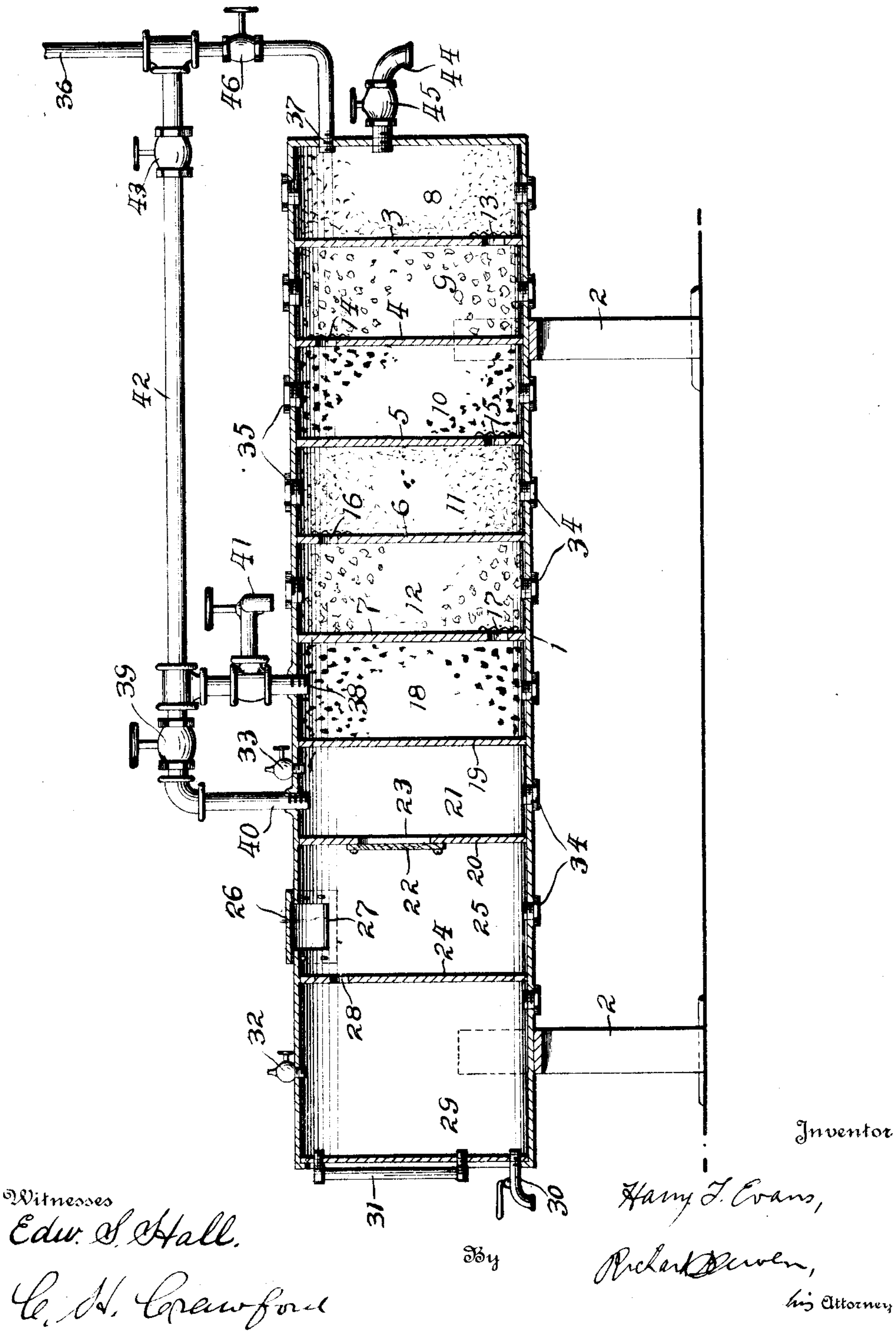
Witnesses
Edw. S. Hall.
C. H. Crawford
Inventor
Harry T. Evans,
By Richard Bowen,
his Attorney

UNITED STATES PATENT OFFICE.

HARRY T. EVANS, OF EL CENTRO, CALIFORNIA.

FILTER.

1,182,467. Specification of Letters Patent. Patented May 9, 1916.

Application filed November 6, 1913. Serial No. 799,566.

*To all whom it may concern:*

Be it known that I, HARRY T. EVANS, a citizen of the United States, residing at El Centro, in the county of Imperial and State of California, have invented certain new and useful Improvements in Filters, of which the following is a specification.

This invention relates to improvements in filters which are primarily intended for filtering water for drinking, cooking and washing purposes, although I do not wish to be limited to this utility of my invention.

My invention consists in forcing the water, preferably through a circuitous path, and interposing in the path of the water, filtering mediums of different grades and character so that during passage of the water therethrough a complete filtering action will result.

The device of my invention also includes improved arrangement of connection for the water whereby a return flow may be effected for cleansing the filtering medium.

Further objects of the invention will be more fully described in connection with the accompanying drawings and will be more particularly pointed out and ascertained in and by the appended claim.

In the drawings: the figure illustrates a longitudinal sectional view illustrative of one form of my invention.

As illustrated, 1 designates a filter tank which may be mounted upon suitable supports, as designated at 2. The filter tank 1 is divided by partitions 3, 4, 5, 6 and 7, into compartments 8, 9, 10, 11 and 12. The partitions 3 to 7 are provided with openings 13, 14, 15, 16, and 17, respectively, which are alternately disposed near the top and bottom of the filter tank 1 so as to cause the liquid or water passing therethrough to take a tortuous or circuitous course. In the several filter compartments, I dispose filtering mediums of different character and I may dispose in compartment 8 a filtering medium consisting of fine sand, and in compartment 9 a filtering medium consisting of coarse sand. In compartment 10 I prefer to use charcoal. Likewise in compartment 11 fine sand will be disposed and compartment 12 coarse sand. In compartment 18 I will dispose charcoal. It will be understood that the openings 13 to 17 may be provided with screens or other means whereby passage of the filtering material from one compartment into another compartment will be prevented. The arrangement of the filtering passages 13 to 17, in the otherwise imperforate partition walls 3 to 7, necessitates the passage of all of the liquid to be filtered through the filtering material in the compartment through which it is forced so as to efficiently and thoroughly separate from the liquid any residue or foreign matter, or impurities, with which even drinking water is usually laden.

A diverting partition 19 serves to arrest flow of the liquid longitudinally of the tank 1 to divert the liquid through a connection which will be presently described, and therefore chamber 18 may comprise the final filtering chamber.

A partition 20, with the partition 19, divides the tank 1 into a chamber 21 in which water flows which has been passed through the filtering mediums. Partition 20 may be termed a filtering partition by reason of the fact that the same is provided with filtering means which, as shown, consists of a plate of earthen material 22. The earthen filtering material 22 is secured to the partition 20 abreast of an opening 23 therein so as to effect a final filtering of the liquid before the same is discharged. The tank is further divided by partition 20 and a partition 24, into a residue or clean-out chamber 25 into which the liquid flows through the filter 22. A suitable clean-out closure 26 is fastened to the tank 1 so as to normally close a clean-out opening 27. When the water rises in the residue or clean-out chamber 25 to a level at a predetermined height, it will pass through an opening 28, in the partition 24, into the final supply chamber 29. From the final supply chamber 29 the filtered liquid may be drawn off by a valve dispensing outlet 30. A glass 31 may be provided to determine the level of the liquid in the final drawoff chamber 29. Air cocks 32 and 33, and withdrawing and filling plugs 34 and 35 may be provided where it is desired.

I will next refer to the connections whereby passage of water is supplied and controlled in its flow through the filter. A supply pipe 36 will be connected with a source of supply of liquid or water under pressure, and said supply pipe 36 discharges, as at 37, into chamber 8. The water or other liquid will pass through chambers 8 and describe angular paths upwardly and downwardly and alternate chambers from chamber 8 through chambers 9, 10, 11 and 12. When the liquid gets into chamber 18, which is the diverting or final filtering chamber, it will rise in said chamber and pass into the intake 38 of a bypass pipe which is provided with a controlling valve 39 and which discharges, as at 40, into chamber 21. The water is forced through the earthen filter 22 into the residue chamber 25, under pressure, from initial supply 36. If it should be desired to draw off water which has passed through all of the filtering mediums, without waiting for its passage through the final filter 22, a valved draw off connection 41 may be provided to branch out from bypass pipe 38. To facilitate the proper supply through drawoff 41, valve 39 will be closed so that all of the water entering bypass at 38, from chamber 18, will flow through drawoff 41.

In some cases it will be desired to cleanse the filtering materials in the several chambers without actually removing and renewing the filtering material. To provide for this operation, I connect the supply pipe 36 by a reverse pipe 42 which is provided with a valve 43. The reverse pipe 42 enters the bypass pipe so as to discharge through 38 into chamber 18. This flow into chamber 18 will be to the right of the figure and a suitable outlet will be provided, as at 44, from chamber 8. The outlet 44 is provided with a valve 45, which is normally closed but which is open for return or washing action of the filtering material. Supply pipe 36 is provided with a valve 46 which will be closed when it is desired to send a supply of water through 42 to chamber 18 for reverse or cleaning action. Any suitable piping and valve connection may be arranged from the pipe 36 to permit the supply of unfiltered water from this pipe and it will be understood that only that part of the water from the supply pipe 36 which passes through the valve 46 will be filtered.

While I have herein shown and described one specific form of my invention, it will be understood that slight changes might be made in the form and arrangement of the various parts of the structure without departing from the spirit and scope of my invention, and hence I do not wish to be limited thereto except for such limitations as the claim may import.

I claim:—

In a filter of the character described, a horizontally arranged tank, a solid partition arranged within said tank substantially mid-way the ends thereof, a plurality of other partitions arranged in spaced relation at one side of said first named partition, said last mentioned partitions being provided with staggered openings and forming a plurality of filter chambers, a fluid inlet to one of said filter chambers, a fluid outlet communicating with another of said chambers, another partition arranged in said tank in spaced relation to said first mentioned partition, said last mentioned partition having a central opening covered by a section of filtering material, pipes connecting said fluid outlet from one of said first mentioned chambers, with the chamber formed between said first and last mentioned partitions, another partition arranged in said tank in spaced relation to said first mentioned partition to form a settling chamber, the last mentioned partition having an opening in close proximity to its upper edge to permit the surface fluid in the settling chamber to flow to the chamber beyond said last mentioned partition, a storage chamber formed between said last mentioned partition and the adjacent end of said tank, means to withdraw the fluid from said storage chamber, and said tank being cut away adjacent said settling chamber whereby access may be had to said chamber for cleaning purposes, and means to close said cut away portion, substantially as described.

In testimony whereof I affix my signature in presence of two witnesses.

HARRY T. EVANS.

Witnesses:
LELAND BONHAM,
CESAR NONELLA.